(12) United States Patent
Nogi

(10) Patent No.: US 10,184,411 B2
(45) Date of Patent: Jan. 22, 2019

(54) EXHAUST PURIFICATION SYSTEM FOR INTERNAL COMBUSTION ENGINE

(71) Applicant: TOYOTA JIDOSHA KABUSHIKI KAISHA, Toyota-shi, Aichi-ken (JP)

(72) Inventor: Yoshito Nogi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 191 days.

(21) Appl. No.: 15/104,798

(22) PCT Filed: Dec. 20, 2013

(86) PCT No.: PCT/JP2013/084371
§ 371 (c)(1),
(2) Date: Jun. 15, 2016

(87) PCT Pub. No.: WO2015/092941
PCT Pub. Date: Jun. 25, 2015

(65) Prior Publication Data
US 2016/0319757 A1 Nov. 3, 2016

(51) Int. Cl.
*F02D 41/02* (2006.01)
*F02D 13/02* (2006.01)
(Continued)

(52) U.S. Cl.
CPC ....... *F02D 41/0275* (2013.01); *F01N 3/0842* (2013.01); *F01N 3/0871* (2013.01); *F02D 13/0219* (2013.01); *F02D 13/0249* (2013.01); *F02D 13/0261* (2013.01); *F02D 41/006* (2013.01); *F02D 41/0055* (2013.01); *F02D 41/1461* (2013.01); *F02D 41/405* (2013.01);
(Continued)

(58) Field of Classification Search
CPC ........................... F02D 41/0275; F01N 3/0842
See application file for complete search history.

(56) References Cited

U.S. PATENT DOCUMENTS

| 2006/0063046 | A1  | 3/2006  | Hu et al. |
| 2013/0000284 | A1* | 1/2013  | Bisaiji ............... F01N 3/0821 60/299 |
| 2013/0323131 | A1  | 12/2013 | Bisaiji |

FOREIGN PATENT DOCUMENTS

| EP | 1 136 682 A2 | 9/2001 |
| EP | 1 892 400 A2 | 2/2008 |

(Continued)

*Primary Examiner* — Mark Laurenzi
*Assistant Examiner* — Jason Sheppard
(74) *Attorney, Agent, or Firm* — Finnegan, Henderson, Farabow, Garrett & Dunner, LLP

(57) ABSTRACT

Rich control is performed to hold an air-fuel ratio of an exhaust gas discharged from an engine combustion chamber temporarily richer than the stoichiometric air-fuel ratio by injecting additional fuel into a cylinder in an expansion stroke or exhaust stroke while an exhaust gas recirculation rate is made lower than a base exhaust gas recirculation rate. A variable valve timing mechanism able to change an overlap period is provided. When ending rich control (ta2), the injection of additional fuel is stopped and the overlap period (OL) is increased from a base overlap period (OLB) and held there while an EGR rate (REGR) is kept lower than a base EGR rate (REGRB) and when a delay time (dt) elapses, the EGR rate and the overlap period are reset to the base EGR rate and the base overlap period.

2 Claims, 13 Drawing Sheets

(51) Int. Cl.
*F02D 41/00* (2006.01)
*F02D 41/40* (2006.01)
*F02M 26/05* (2016.01)
*F01N 3/08* (2006.01)
*F02D 41/14* (2006.01)

(52) U.S. Cl.
CPC ......... *F02M 26/05* (2016.02); *F01N 2560/06* (2013.01); *F01N 2610/03* (2013.01); *F01N 2900/0416* (2013.01); *F01N 2900/1602* (2013.01); *F01N 2900/1614* (2013.01); *F02D 41/1462* (2013.01); *F02D 2041/001* (2013.01); *F02D 2200/0811* (2013.01); *Y02T 10/18* (2013.01); *Y02T 10/44* (2013.01); *Y02T 10/47* (2013.01)

(56) References Cited

FOREIGN PATENT DOCUMENTS

| | | |
|---|---|---|
| EP | 2 642 096 A1 | 9/2013 |
| JP | 2008-38803 | 2/2008 |
| JP | 2008-513285 | 5/2008 |
| JP | 2011-1893 | 1/2011 |
| JP | WO 2011118044 A1 * | 9/2011 ........... F01N 3/0821 |
| WO | WO 2006/030273 A1 | 3/2006 |
| WO | WO 2012/108063 A1 | 8/2012 |

* cited by examiner

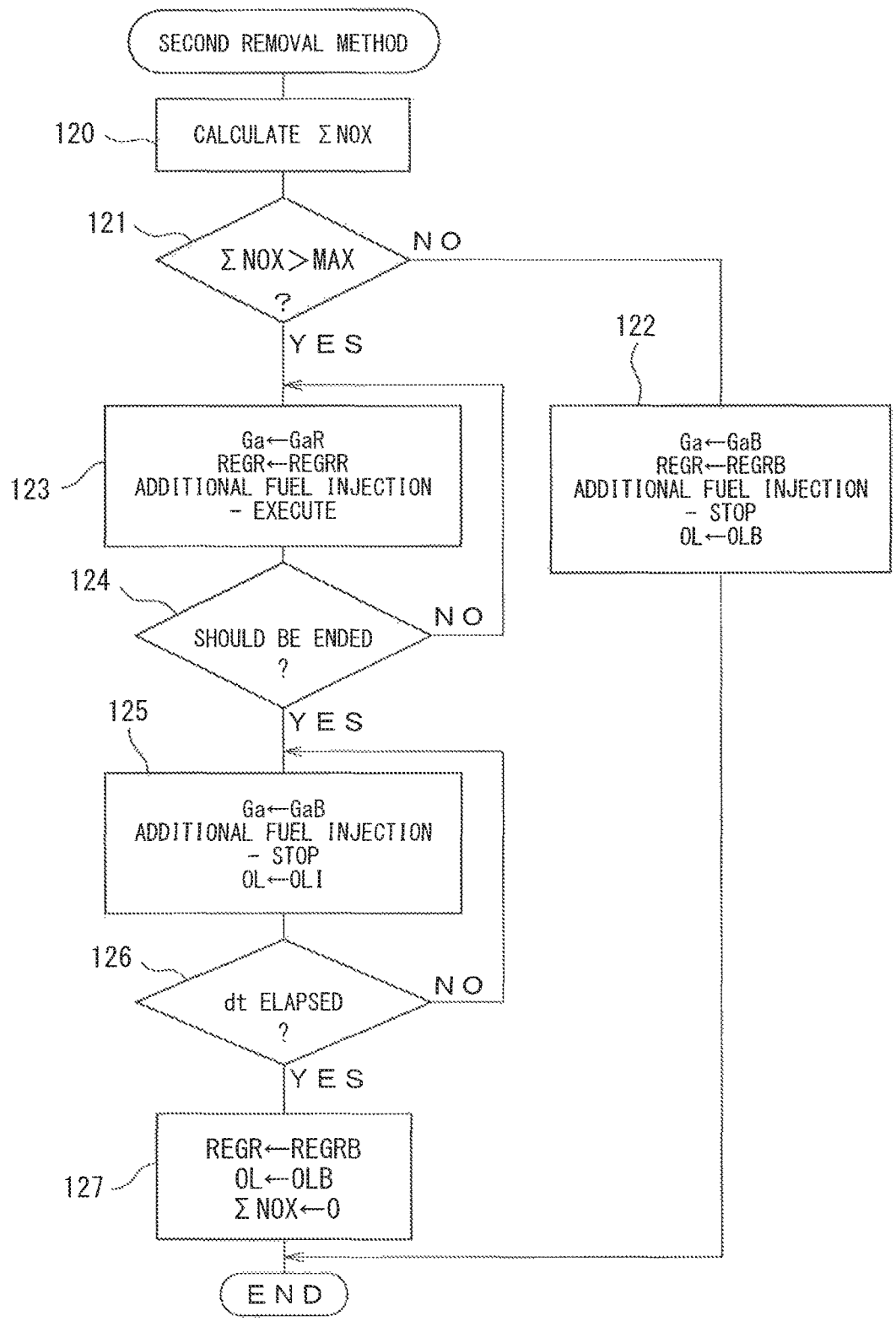

EXHAUST PURIFICATION SYSTEM FOR INTERNAL COMBUSTION ENGINE

CROSS-REFERENCE TO RELATED APPLICATIONS

This application is a national phase application of International Application No. PCT/JP2013/084371, filed Dec. 20, 2013, the content of which is incorporated herein by reference.

TECHNICAL FIELD

The present invention relates to an exhaust purification system for an internal combustion engine.

BACKGROUND ART

An exhaust purification system for an internal combustion engine is known in the art, where an exhaust turbocharger is provided for driving a compressor arranged in an engine intake passage upstream of a throttle valve using an exhaust turbine arranged inside an engine exhaust passage, the engine exhaust passage upstream of the exhaust turbine and the engine intake passage downstream of the throttle valve are connected by a high pressure exhaust gas recirculation passage while a high pressure exhaust gas recirculation control valve is arranged in the high pressure exhaust gas recirculation passage, the engine exhaust passage downstream of the exhaust turbine and the engine intake passage upstream of the compressor are connected by a low pressure exhaust gas recirculation passage while a low pressure exhaust gas recirculation control valve is arranged in the low pressure exhaust gas recirculation passage, and rich control is performed to hold an air-fuel ratio of an exhaust gas discharged from an engine combustion chamber temporarily richer than the stoichiometric air-fuel ratio by injecting additional fuel into a cylinder in an expansion stroke or exhaust stroke while an exhaust gas recirculation rate is made lower than a base exhaust gas recirculation rate. In this exhaust purification system, when starting rich control, the exhaust gas recirculation rate is lowered by decreasing an amount of the exhaust recirculation gas from the high pressure exhaust gas recirculation passage, while when ending the rich control, the exhaust gas recirculation rate is reset by resetting the amount of the exhaust recirculation gas from the high pressure exhaust gas recirculation passage.

In this regard, when rich control is being performed, a temperature of the exhaust gas discharged from a combustion chamber is considerably high. For this reason, when ending rich control, if immediately resetting the amount of the exhaust recirculation gas from the high pressure exhaust gas recirculation passage, a large amount of high temperature exhaust gas will flow into the high pressure exhaust gas recirculation passage and the high pressure exhaust gas recirculation passage or high pressure exhaust gas recirculation control valve will be liable to be damaged by the heat.

In this regard, it might seem that if continuing to decrease the amount of the exhaust recirculation gas from the high pressure exhaust gas recirculation passage for a certain time after the rich control was performed, the problem of damage due to heat could be solved. However, if the exhaust gas recirculation rate is held low, production of $NO_X$ might not be able to be reduced.

Therefore, an exhaust purification system of an internal combustion engine is known in the art which, when ending rich control, the injection of additional fuel is stopped and an amount of exhaust recirculation gas from the low pressure exhaust gas recirculation passage is increased and held while reducing the amount of the exhaust recirculation gas from the high pressure exhaust gas recirculation passage, then, when a delay time elapses, the amount of exhaust recirculation gas from the high pressure exhaust gas recirculation passage and the amount of exhaust recirculation gas from the low pressure exhaust gas recirculation passage are reset (see PLT 1). That is, up until the elapse of the delay time from the end of rich control, the exhaust recirculation gas from the high pressure exhaust gas recirculation passage continues to be decreased. Further, a temperature of the exhaust recirculation gas supplied from the low pressure exhaust gas recirculation passage is relatively low. Therefore, a danger of damage due to heat is reduced. At the same time, the exhaust recirculation gas from the low pressure exhaust gas recirculation passage is increased, so the production of $NO_X$ can be reliably suppressed.

CITATIONS LIST

Patent Literature

PLT 1: Japanese Patent Publication No. 2008-038803A

SUMMARY OF INVENTION

Technical Problem

In this regard, the above-mentioned problem of damage due to heat may also occur in an internal combustion engine not provided with a low pressure exhaust gas recirculation passage and low pressure exhaust gas recirculation control valve. However, PLT 1 requires a low pressure exhaust gas recirculation passage and low pressure exhaust gas recirculation control valve, so the technique of PLT 1 cannot be applied to an internal combustion engine not provided with a low pressure exhaust gas recirculation passage and low pressure exhaust gas recirculation control valve. Further, responsiveness of the supply of exhaust recirculation gas from the low pressure exhaust gas recirculation passage is low, so right after ending rich control, the production of $NO_X$ is liable to be unable to be reliably suppressed.

An object of the present invention is to provide an exhaust purification system for an internal combustion engine able to suppress an occurrence of damage due to heat while reliably suppressing production of $NO_X^*$.

Solution to Problem

According to the present invention, there is provided an exhaust purification system for an internal combustion engine, wherein an engine intake passage downstream of a throttle valve and an engine exhaust passage are connected by an exhaust gas recirculation passage, an exhaust gas recirculation control valve is provided for controlling an amount of recirculated exhaust gas flowing through the exhaust gas recirculation passage, and rich control is performed to hold an air-fuel ratio of an exhaust gas discharged from an engine combustion chamber temporarily richer than the stoichiometric air-fuel ratio by injecting additional fuel into a cylinder in an expansion stroke or exhaust stroke while an exhaust gas recirculation rate is made lower than a base exhaust gas recirculation rate, characterized in that a variable valve timing mechanism able to change an overlap period during which an opening timing of an intake valve and a closing timing of an exhaust valve overlap is provided and, when ending rich control, the injection of additional fuel is stopped and the overlap period is increased from a base overlap period and held there while keeping the exhaust gas recirculation rate lower than the base exhaust gas recirculation rate, and when a predetermined delay time next elapses, the exhaust gas recirculation rate and the overlap period are respectively reset to the base exhaust gas recirculation rate and the base overlap period.

Advantageous Effects of Invention

It is possible to reliably suppress an occurrence of damage due to heat while suppressing generation of $NO_X^*$.

BRIEF DESCRIPTION OF DRAWINGS

FIG. 19 is a flow chart for performing an $NO_X$ removal action by a second $NO_X$ removal method.

DESCRIPTION OF EMBODIMENTS

Figure 1:
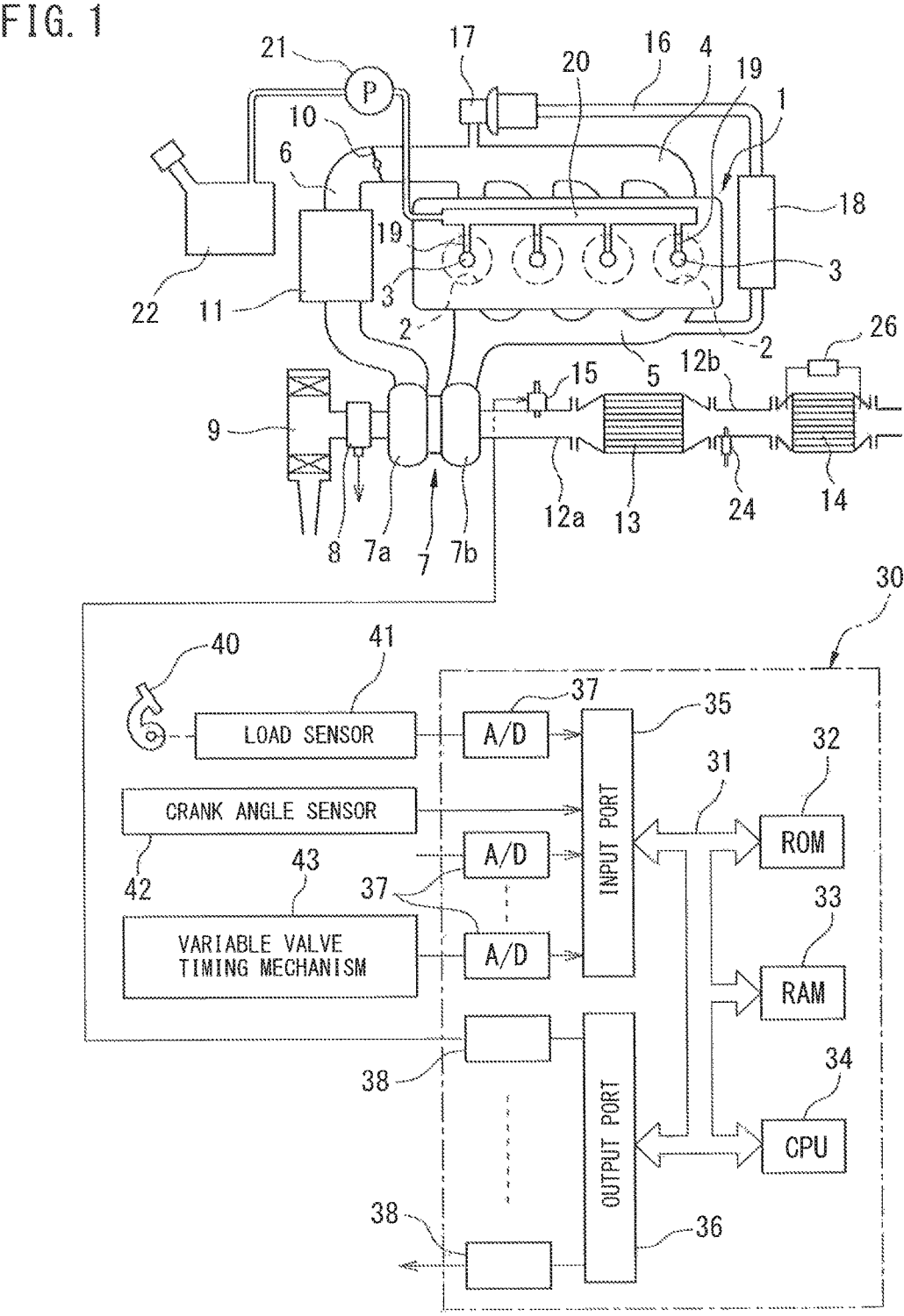
FIG. 1 is an overall view of a compression ignition type internal combustion engine.

FIG. 1 is an overall view of a compression ignition type internal combustion engine. Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by an actuator is arranged. Around the intake duct 6, a cooling device 11 is arranged for cooling an intake air flowing through the inside of the intake duct 6. In the embodiment shown in FIG. 1, an engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12a to an inlet of the exhaust purification catalyst 13. In the embodiment according to the present invention, this exhaust purification catalyst 13 is comprised of an $NO_X$ storage catalyst. An outlet of the exhaust purification catalyst 13 is connected through the exhaust pipe 12b to a particulate filter 14. Inside the exhaust pipe 12a upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. Each fuel injector 3 is connected through a fuel feed tube 19 to a common rail 20. This common rail 20 is connected through an electronically controlled variable discharge fuel pump 21 to a fuel tank 22. The fuel stored inside of the fuel tank 22 is fed by the fuel pump 21 to the inside of the common rail 20. The fuel fed to the inside of the common rail 20 is fed through each fuel feed tube 19 to the fuel injector 3.

An electronic control unit 30 is comprised of a digital computer provided with components which are connected with each other by a bidirectional bus 31 such as a ROM (read only memory) 32, a RAM (random access memory) 33, a CPU (microprocessor) 34, an input port 35, and an output port 36. A temperature sensor 24 is attached to the exhaust pipe 12b downstream of the exhaust purification catalyst 13, for detecting a temperature of the exhaust gas flowing out from the exhaust purification catalyst 13. The temperature of the exhaust gas flowing out from the exhaust purification catalyst 13 expresses a temperature of the exhaust purification catalyst 13. Further, a differential pressure sensor 26 is attached to the particulate filter 14, for detecting a differential pressure across the particulate filter 14. The output signals of the temperature sensor 24, differential pressure sensor 26, and intake air amount detector 8 are input through respectively corresponding AD converters 37 to the input port 35. Further, an accelerator pedal 40 has a load sensor 41 connected to it generating an output voltage proportional to an amount of depression L of the accelerator pedal 40. The output voltage of the load sensor 41 is input through a corresponding AD converter 37 to the input port 35. Furthermore, a crank angle sensor 42 is connected to the input port 35, which generates an output pulse every time a crankshaft rotates by, for example, 15°. On the other hand, the output port 36 is connected through corresponding drive circuits 38 to each fuel injector 3, actuator for driving the throttle valve 10, hydrocarbon feed valve 15, EGR control valve 17, fuel pump 21, and a variable valve timing mechanism 43.

Figure 2:
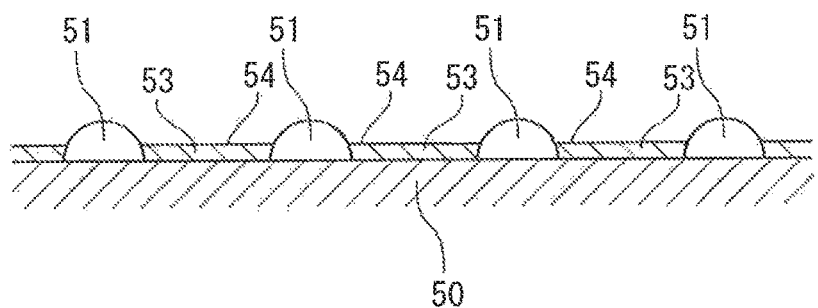
FIG. 2 is a view schematically showing a surface part of a catalyst carrier.

FIG. 2 schematically shows a surface part of a catalyst carrier carried on a substrate of the exhaust purification catalyst 13 which is shown in FIG. 1. At this exhaust purification catalyst 13, as shown in FIG. 2, for example, a catalyst carrier 50 comprised of alumina carries a precious metal catalyst 51 comprised of platinum Pt. Furthermore, on this catalyst carrier 50, a basic layer 53 is formed including at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_X$. Inside of this basic layer 53, ceria $CeO_2$ is contained. Therefore, the exhaust purification catalyst 13 has an oxygen storing ability. Further, the catalyst carrier 50 of the exhaust purification catalyst 13 can also carry rhodium Rh or palladium Pd in addition to platinum Pt. Note that the exhaust gas flows along the top of the catalyst carrier 50, so the precious metal catalyst 51 can be said to be carried on an exhaust gas flow surface of the exhaust purification catalyst 13. Further, the surface of the basic layer 53 exhibits basicity, so a surface of the basic layer 53 is called as a "basic exhaust gas flow surface part 54."

Figure 3:
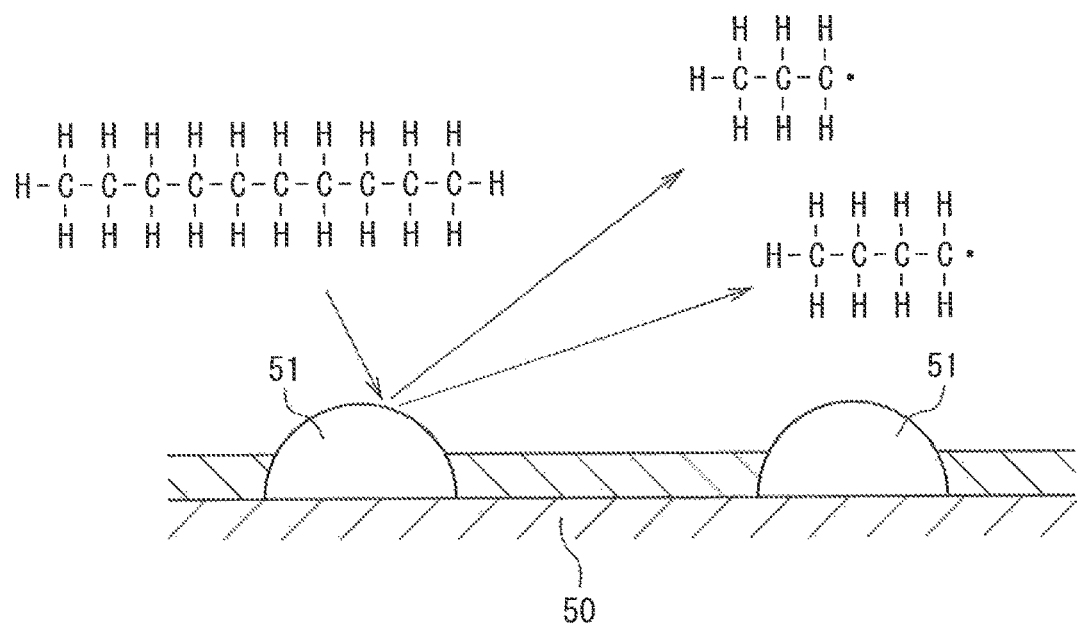
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, the hydrocarbons reformed at this time are used to remove the $NO_X$ at the exhaust purification catalyst 13. FIG. 3 schematically shows a reforming action performed at the exhaust purification catalyst 13 at this time. As shown in FIG. 3, the hydrocarbons HC injected from the hydrocarbon feed valve 15 become radical hydrocarbons HC with a small carbon number by the precious metal catalyst 51.

Figure 4:
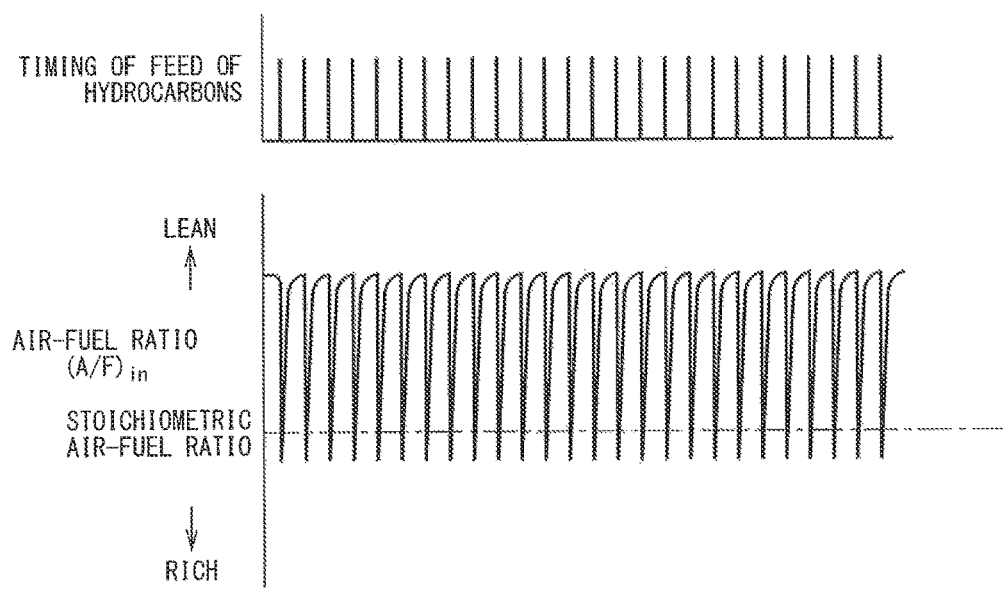
FIG. 4 is a view showing a change of air-fuel ratio of exhaust gas flowing into an exhaust purification catalyst.

FIG. 4 shows feed timing of hydrocarbons from the hydrocarbon feed valve 15 and a change in the air-fuel ratio (A/F)in of the exhaust gas flowing into the exhaust purification catalyst 13. Note that, the change in the air-fuel ratio (A/F)in depends on a change in concentration of the hydrocarbons in the exhaust gas flowing into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
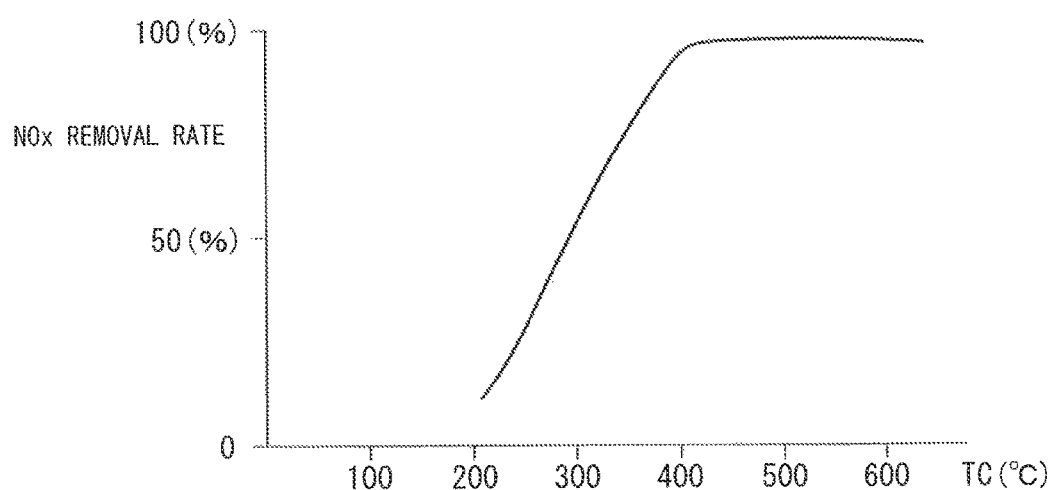
FIG. 5 is a view showing an $NO_X$ removal rate.

FIG. 5 shows the $NO_X$ removal rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 periodically rich. Now, the inventors engaged in research relating to $NO_X$ purification for a long time. As a result, they learned that if making the concentration of hydrocarbons flowing into the exhaust purification catalyst 13 vibrates with an amplitude within a predetermined range of amplitude and with a period within the predetermined range of period, as shown in FIG. 5, an extremely high $NO_X$ removal rate is obtained even in a 400° C. or higher high temperature region.

Figure 6A:
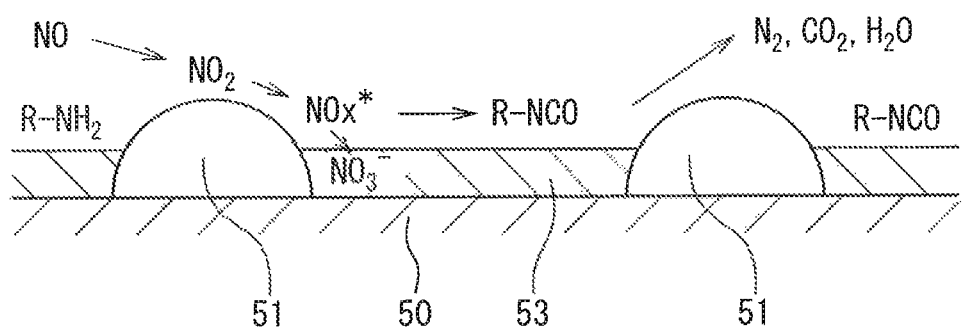
FIGS. 6A and 6B are views for explaining an oxidation reduction reaction in an exhaust purification catalyst.
Figure 6B:
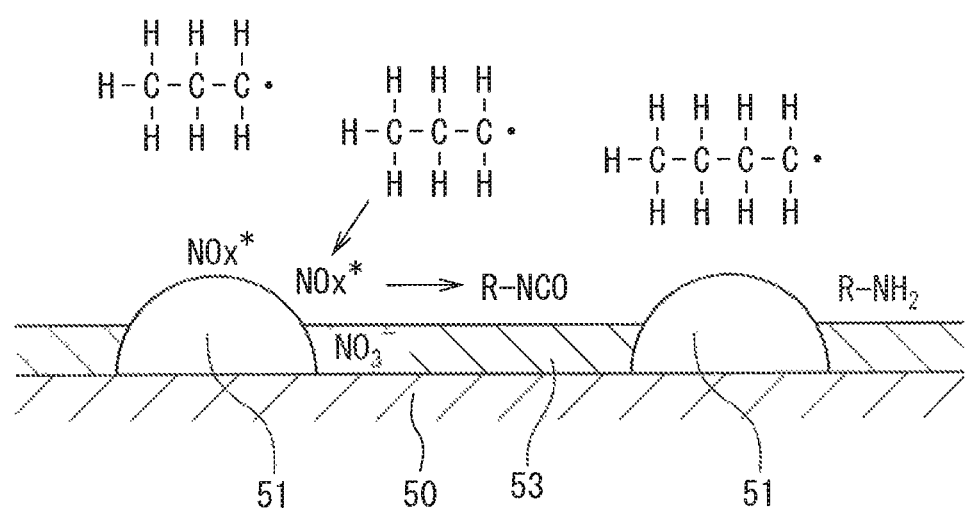

Furthermore, it is learned that, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13, and that this reducing intermediate plays a central role in obtaining a high $NO_X$ removal rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate with an amplitude within the predetermined range of amplitude and with a period within the predetermined range of period.

FIG. 6A shows when the concentration of hydrocarbons flowing into the exhaust purification catalyst 13 is low, while FIG. 6B shows when hydrocarbons are fed from the hydrocarbon feed valve 15 to make the air-fuel ratio (A/F)in of the exhaust gas flowing into the exhaust purification catalyst 13 rich, that is, when the concentration of hydrocarbons flowing into the exhaust purification catalyst 13 is high.

Now, as will be understood from FIG. 4, the air-fuel ratio of the exhaust gas flowing into the exhaust purification catalyst 13 is maintained lean except for an instant, so the exhaust gas flowing into the exhaust purification catalyst 13 is normally under an excess oxygen condition. At this time, part of NO contained in the exhaust gas adheres to the exhaust purification catalyst 13 and the part of the NO contained in the exhaust gas, as shown in FIG. 6A, is oxidized on the platinum 51 and becomes $NO_2$. Next, this $NO_2$ is further oxidized to $NO_3$. Further part of the $NO_2$ becomes $NO_2^-$. Therefore, on the platinum Pt 51, $NO_2^-$ and $NO_3$ are produced. The NO adhered to the exhaust purification catalyst 13 and the $NO_2^-$ and $NO_3$ produced on the platinum Pt 51 are strong in activity. Therefore, below, these NO, $NO_2^-$, and $NO_3$ will be referred to as an active $NO_X^*$.

On the other hand, if hydrocarbons are fed from the hydrocarbon feed valve 15 and the air-fuel ratio (A/F)in of the exhaust gas flowing into the exhaust purification catalyst 13 is made rich, the hydrocarbons successively adhere to the exhaust purification catalyst 13 as a whole. The majority of the adhered hydrocarbons successively reacts with the oxygen and is made to burn, while part of the adhered hydrocarbons is successively, as shown in FIG. 3, reformed and becomes radicalized inside of the exhaust purification catalyst 13. Therefore, as shown in FIG. 6B, the hydrocarbon concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate held or adsorbed on the surface of the basic layer 53 is believed to be the isocyanate compound R—NCO and amine compound R—NH$_2$.

On the other hand, if hydrocarbons HC adhere around the reducing intermediate produced as shown in FIG. 6B, the reducing intermediate is blocked by the hydrocarbons HC and the reaction will not proceed any further. In this case, if the concentration of hydrocarbons flowing into the exhaust purification catalyst 13 is lowered and then the hydrocarbons adhered around the reducing intermediate are oxidized and consumed and, due to this, the oxygen concentration around the reducing intermediate becomes higher, the reducing intermediate reacts with the NO$_X$ in the exhaust gas or the active NO$_X$* or reacts with the surrounding oxygen or breaks down on its own. Due to this, the reducing intermediate R—NCO or R—NH$_2$, as shown in FIG. 6A, is converted to N$_2$, CO$_2$, and H$_2$O and therefore NO$_X$ is removed.

In this way, in the exhaust purification catalyst 13, by making the concentration of hydrocarbons flowing into the exhaust purification catalyst 13 higher, a reducing intermediate is produced. When the oxygen concentration rises after the concentration of hydrocarbons flowing into the exhaust purification catalyst 13 is lowered, the reducing intermediate reacts with the NO$_X$ in the exhaust gas or the active NO$_X$* or oxygen or breaks down by itself whereby the NO$_X$ is removed. That is, in order for the exhaust purification catalyst 13 to remove the NO$_X$, the concentration of hydrocarbons flowing into the exhaust purification catalyst 13 has to be periodically changed.

Of course, in this case, it is necessary to increase the concentration of hydrocarbons to a concentration sufficiently high for producing the reducing intermediate and it is necessary to lower the concentration of hydrocarbons to a concentration sufficiently low for making the produced reducing intermediate react with the NO$_X$ in the exhaust gas or the active NO$_X$* or oxygen or for making it break down on its own. That is, it is necessary to make the concentration of hydrocarbons flowing into the exhaust purification catalyst 13 vibrate with an amplitude within a predetermined range of amplitude. Note that, in this case, it is necessary to hold these reducing intermediates on the basic layer 53, that is, the basic exhaust gas flow surface part 54, until the produced reducing intermediate R—NCO or R—NH$_2$ reacts with the NO$_X$ in the exhaust gas or the active NO$_X$* or oxygen or until it breaks down on its own. For this reason, the basic exhaust gas flow surface part 54 is provided.

On the other hand, if lengthening the feed period of the hydrocarbons, the time in which the oxygen concentration is higher becomes longer in the period after the hydrocarbons are fed until the hydrocarbons are next fed. Therefore, the active NO$_X$* is absorbed in the basic layer 53 in the form of nitrates without producing a reducing intermediate. To avoid this, it is necessary to make the concentration of hydrocarbons flowing into the exhaust purification catalyst 13 vibrate with a period within a predetermined range of period.

Therefore, in the embodiment of the present invention, to make the NO$_X$ contained in the exhaust gas and the reformed hydrocarbons react to produce the reducing intermediate R—NCO or R—NH$_2$ containing nitrogen and hydrocarbons, the precious metal catalyst 51 is carried on the exhaust gas flow surface of the exhaust purification catalyst 13. To hold the produced reducing intermediate R—NCO or R—NH$_2$ inside the exhaust purification catalyst 13, the basic exhaust gas flow surface part 54 is formed around the precious metal catalyst 51. The reducing intermediate R—NCO or R—NH$_2$ held on the basic exhaust gas flow surface part 54 is converted to N$_2$, CO$_2$, and H$_2$O, and the vibration period of the hydrocarbon concentration is made a vibration period required for continuation of the production of the reducing intermediate R—NCO or R—NH$_2$. Incidentally, in the example shown in FIG. 4, an injection interval is made 3 seconds.

Figure 7A:
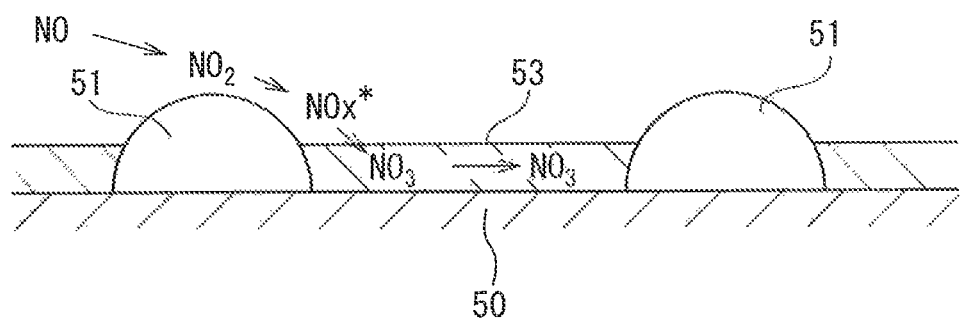
FIGS. 7A and 7B are views for explaining an oxidation reduction reaction in an exhaust purification catalyst.

If the vibration period of the hydrocarbon concentration, that is, the injection period of the hydrocarbons HC from the hydrocarbon feed valve 15, is made longer than the above predetermined range of period, the reducing intermediate R—NCO or R—NH$_2$ disappears from the surface of the basic layer 53. At this time, the active NO$_X$* produced on the platinum Pt 53, as shown in FIG. 7A, diffuses in the basic layer 53 in the form of nitrate ions NO$_3^-$ and becomes nitrates. That is, at this time, the NO$_X$ in the exhaust gas is absorbed in the form of nitrates inside of the basic layer 53.

Figure 7B:
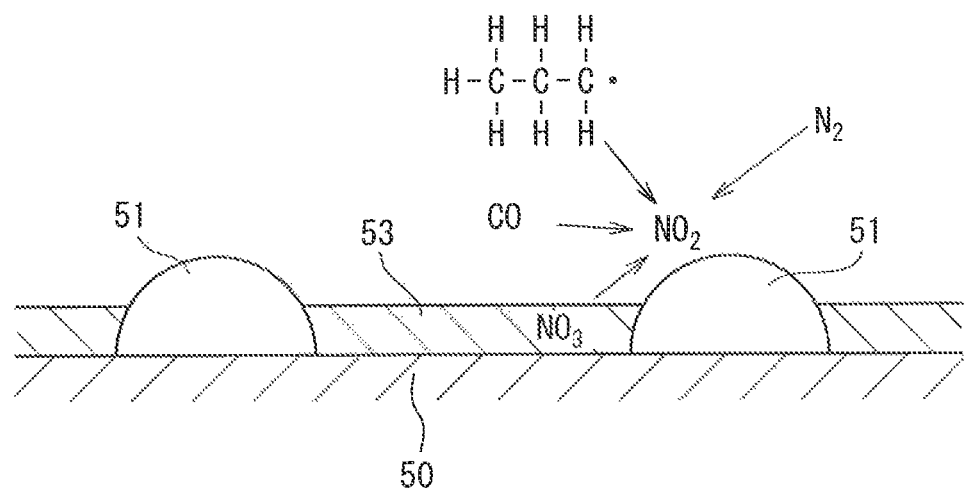

On the other hand, FIG. 7B shows the case where the air-fuel ratio of the exhaust gas flowing into the exhaust purification catalyst 13 is made the stoichiometric air-fuel ratio or rich when the NO$_X$ is absorbed in the form of nitrates inside of the basic layer 53 in the above-mentioned manner. In this case, the oxygen concentration in the exhaust gas falls, so the reaction proceeds in the opposite direction (NO$_3^-$→NO$_2$), and consequently the nitrates absorbed in the basic layer 53 become nitrate ions NO$_3^-$ one by one and, as shown in FIG. 7B, are released from the basic layer 53 in the form of NO$_2$. Next, the released NO$_2$ is reduced by the hydrocarbons HC and CO contained in the exhaust gas.

Figure 8:
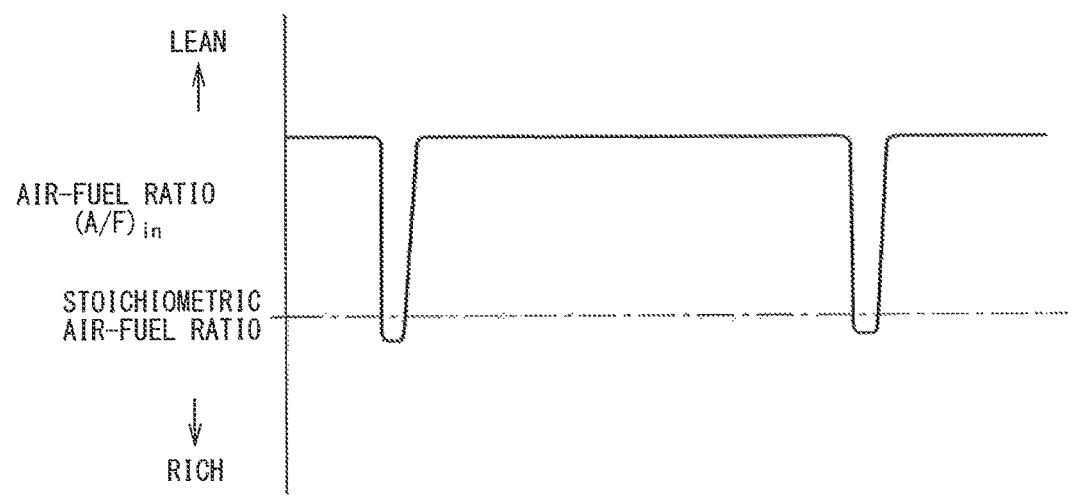
FIG. 8 is a view showing a change of the air-fuel ratio of the exhaust gas flowing into the exhaust purification catalyst.

FIG. 8 shows the case of making the air-fuel ratio (A/F)in of the exhaust gas flowing into the exhaust purification catalyst 13 temporarily rich slightly before a NO$_X$ absorption ability of the basic layer 53 becomes saturated. Note that, in the example shown in FIG. 8, a time interval of this rich control is 1 minute or more. In this case, the NO$_X$ absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing NO$_X$*.

Note that, at this time, sometimes the basic layer 53 temporarily adsorbs the NO$_X$*. Therefore, if using the term of "storage" and "store" as a term including both absorption and adsorption, at this time, the basic layer 53 performs the role of an NO$_X$ storage agent for temporarily storing the NO$_X$*. That is, in this case, if a ratio of the air and fuel (hydrocarbons) supplied into the engine intake passage, combustion chambers 2, and exhaust passage upstream of the exhaust purification catalyst 13 is referred to as an "air-fuel ratio of the exhaust gas", the exhaust purification catalyst 13 functions as an NO$_X$ storage catalyst storing the NO$_X$ when the air-fuel ratio of the exhaust gas is lean and releasing the stored NO$_X$ when the oxygen concentration in the exhaust gas falls.

Figure 9:
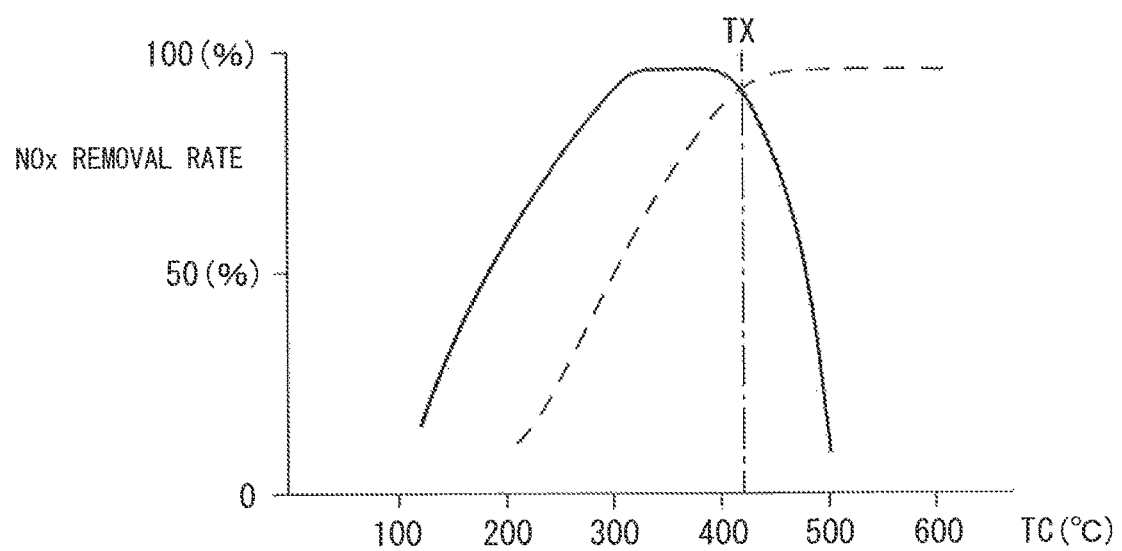
FIG. 9 is a view showing an $NO_X$ removal rate.

In FIG. 9, the solid line shows a NO$_X$ removal rate when making the exhaust purification catalyst 13 function as an NO$_X$ storage catalyst in this way. Note that, in FIG. 9, the abscissa shows the catalyst temperature TC of the exhaust purification catalyst 13. When making the exhaust purification catalyst 13 function as an NO$_X$ storage catalyst in this way, as shown in FIG. 9 by the solid line, when the catalyst temperature TC is 300° C. to 400° C., an extremely high NO$_X$ removal rate is obtained, but when the catalyst temperature TC becomes a 400° C. or higher, the NO$_X$ removal rate falls. Note that FIG. 9 shows the NO$_X$ removal rate shown in FIG. 5 by a broken line.

In this way, when the catalyst temperature TC becomes 400° C. or higher, the $NO_X$ removal rate falls because if the catalyst temperature TC becomes 400° C. or higher, the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ removal rate. However, in the new $NO_X$ removal method shown from FIG. 4 to FIG. 6B, as will be understood from FIGS. 6A and 6B, nitrates are not formed or even if formed are extremely fine in amount, consequently, as shown in FIG. 5, even when the catalyst temperature TC is high, a high $NO_X$ removal rate is obtained.

In the embodiment of the present invention, in order to remove $NO_X$ by using this new $NO_X$ removal method, a hydrocarbon feed valve 15 for feeding hydrocarbons is arranged inside of an engine exhaust passage, an exhaust purification catalyst 13 is arranged in the engine exhaust passage downstream of the hydrocarbon feed valve 15, a precious metal catalyst 51 is carried on an exhaust gas flow surface of the exhaust purification catalyst 13, a basic exhaust gas flow surface part 54 is formed around the precious metal catalyst 51, the exhaust purification catalyst 13 has the property of reducing a $NO_X$ which is contained in exhaust gas if a concentration of hydrocarbons flowing into the exhaust purification catalyst 13 is made to vibrate with an amplitude within a predetermined range of amplitude and with a period within a predetermined range of period and has the property of being increased in storage amount of $NO_X$ which is contained in exhaust gas if the vibration period of the hydrocarbon concentration is made longer than this predetermined range of period, and, at the time of engine operation, hydrocarbons are injected with a period within the predetermined range of period to thereby reduce the $NO_X$ which is contained in the exhaust gas in the exhaust purification catalyst 13.

That is, the $NO_X$ removal method which is shown from FIG. 4 to FIG. 6B can be said to be a new $NO_X$ removal method designed to remove $NO_X$ without forming almost any nitrates in the case of using an exhaust purification catalyst carrying a precious metal catalyst and forming a basic layer which can absorb $NO_X^*$. In actuality, when using this new $NO_X$ removal method, the nitrates detected from the basic layer 53 become much smaller in amount compared with the case where making the exhaust purification catalyst 13 function as an $NO_X$ storage catalyst. Note that, this new $NO_X$ removal method will be referred to below as a "first $NO_X$ removal method".

Figure 10:
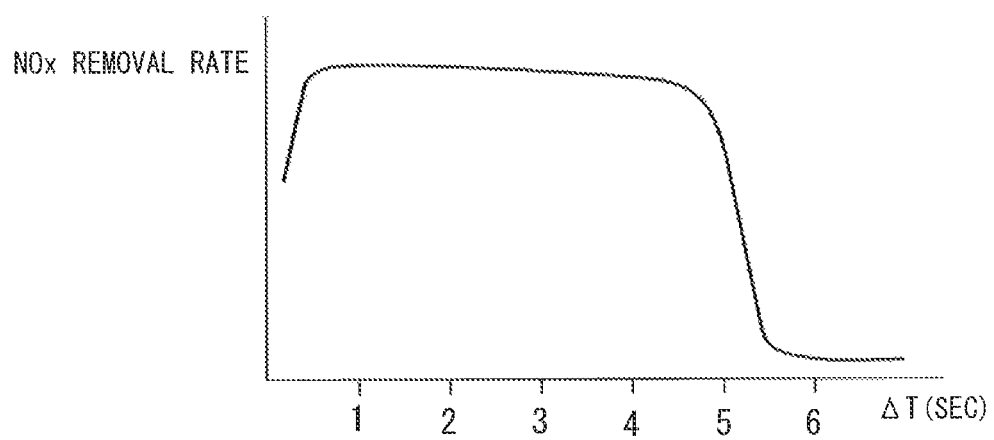
FIG. 10 is a view showing a relationship between a hydrocarbon injection period $\Delta T$ and an $NO_X$ removal rate.

Now, as explained above, if the injection period ΔT of the hydrocarbons from the hydrocarbon feed valve 15 becomes longer, the time during which the oxygen concentration around the active $NO_X^*$ becomes higher becomes longer in the period after the hydrocarbons are injected to when the hydrocarbons are next injected. In this case, in the embodiment which is shown in FIG. 1, if the injection period ΔT of the hydrocarbons becomes longer than about 5 seconds, the active $NO_X^*$ starts to be absorbed in the form of nitrates inside the basic layer 53. Therefore, as shown in FIG. 10, if the vibration period ΔT of the hydrocarbon concentration becomes longer than about 5 seconds, the $NO_X$ removal rate falls. Therefore, in the embodiment which is shown in FIG. 1, the injection period ΔT of the hydrocarbons has to be made 5 seconds or shorter.

On the other hand, in the embodiment according to the present invention, if the injection period ΔT of the hydrocarbons becomes about 0.3 second or shorter, the injected hydrocarbons start to build up on the exhaust gas flow surface of the exhaust purification catalyst 13, therefore, as shown in FIG. 10, if the injection period ΔT of the hydrocarbons becomes about 0.3 second or shorter, the $NO_X$ removal rate falls. Therefore, in the embodiment of the present invention, the injection period of the hydrocarbons is made from 0.3 second to 5 seconds.

Figure 11:
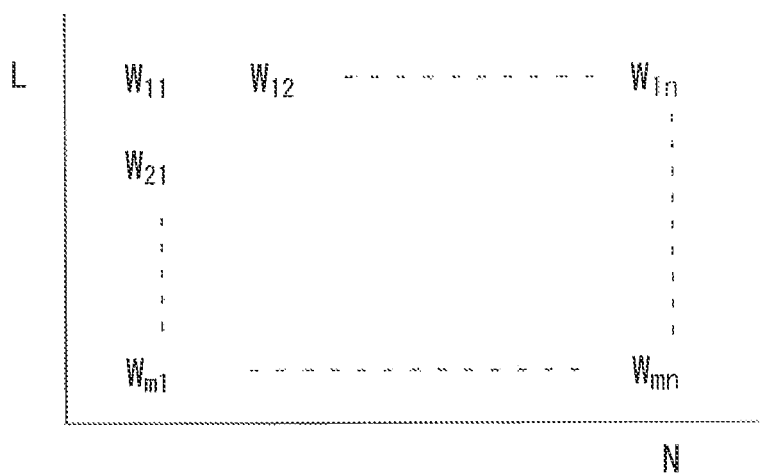
FIG. 11 is a map showing an injection amount of hydrocarbons.

Now, in the embodiment according to the present invention, the air-fuel ratio (A/F)in of the exhaust gas flowing into the exhaust purification catalyst 13 and the injection period ΔT are controlled to be optimum values in accordance with an operating state of the engine by changing an injection amount and injection timing of hydrocarbon from the hydrocarbon feed valve 15. In this case, in the embodiment according to the present invention, the optimum hydrocarbon injection amount W when the $NO_X$ removal action by the first $NO_X$ removal method is being performed is stored as a function of an amount of depression L of the accelerator pedal 40 and the engine speed N in the form of a map such as shown in FIG. 11 in advance in the ROM 32. Further, the optimum injection period ΔT of the hydrocarbons at this time is also stored as a function of the amount of depression L of the accelerator pedal 40 and the engine speed N in the form of a map in advance in the ROM 32.

Next, while referring to FIG. 12 to FIG. 15, the $NO_X$ removal method in the case of making the exhaust purification catalyst 13 function as an $NO_X$ storage catalyst will be specifically explained. The $NO_X$ removal method in the case of making the exhaust purification catalyst 13 function as an $NO_X$ storage catalyst in this way will be referred to below as a "second $NO_X$ removal method".

Figure 12:
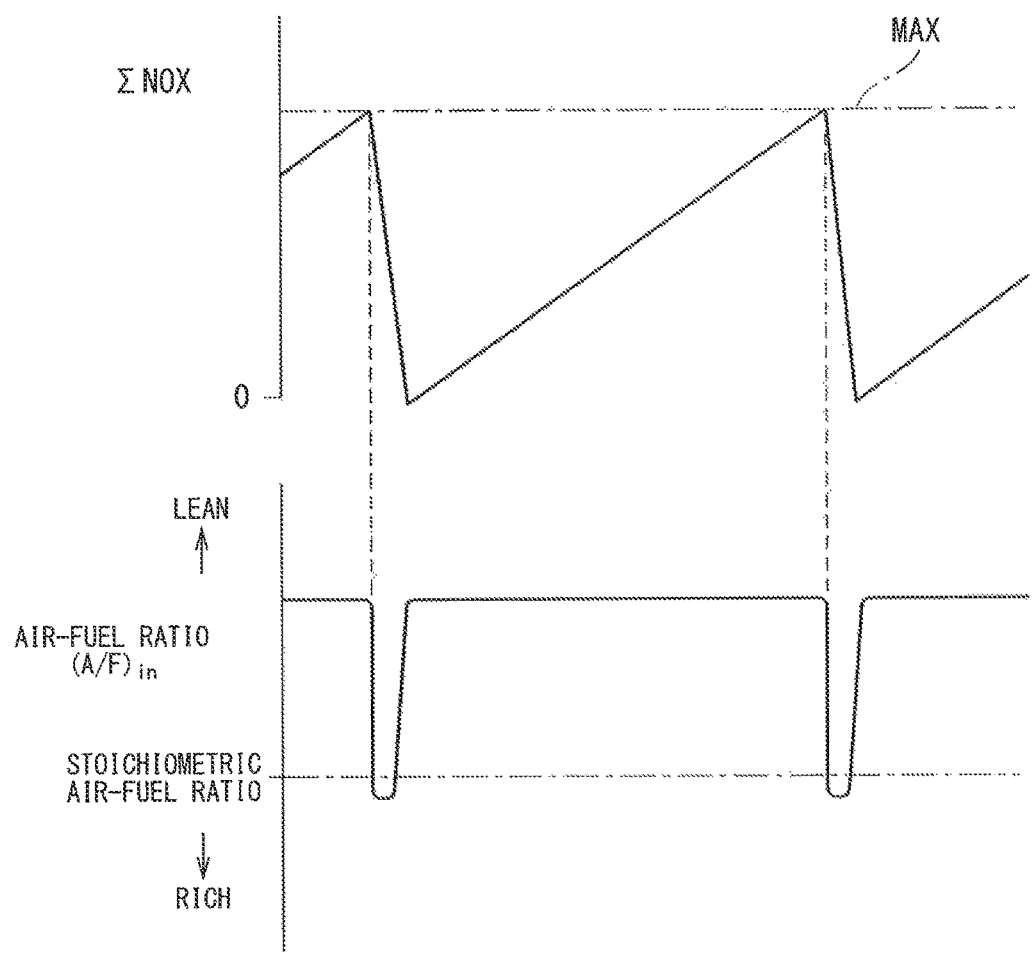
FIG. 12 is a view showing $NO_X$ release control.

In this second $NO_X$ removal method, as shown in FIG. 12, when a stored $NO_X$ amount ΣNOX stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_X$ stored in the basic layer 53 when the air-fuel ratio (A/F)in of the exhaust gas is lean is released all at once from the basic layer 53 and reduced. Due to this, the $NO_X$ is removed.

Figure 13:
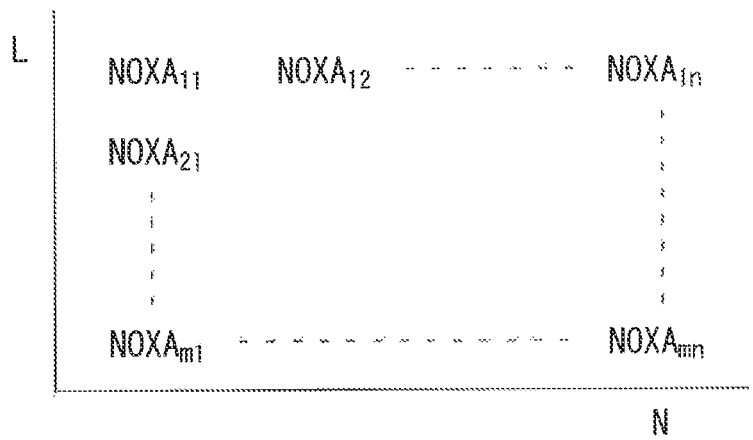
FIG. 13 is a view showing a map of an exhaust $NO_X$ amount NOXA.

The stored $NO_X$ amount ΣNOX is for example calculated from an amount of $NO_X$ discharged from the engine. In the embodiment according to the present invention, a discharged $NO_X$ amount NOXA which is discharged from the engine per unit time is stored as a function of the amount of depression L of the accelerator pedal 40 and the engine speed N in the form of a map such as shown in FIG. 13 in advance in the ROM 32. The stored $NO_X$ amount ΣNOX is calculated from this discharged $NO_X$ amount NOXA. In this case, as explained above, the period by which the air-fuel ratio (A/F)in of the exhaust gas is made rich is usually 1 minute or longer.

Figure 14:
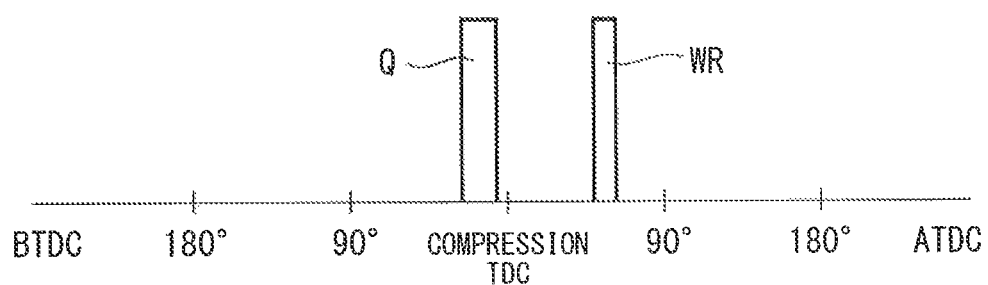
FIG. 14 is a view showing a fuel injection timing.
Figure 15:
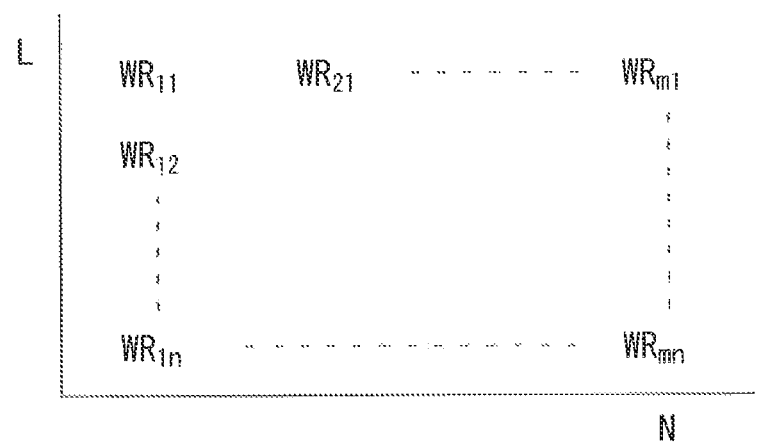
FIG. 15 is a view showing a map of a fuel feed amount WR.

In this second $NO_X$ removal method, as shown in FIG. 14, the air-fuel ratio (A/F)in of the exhaust gas flowing into the exhaust purification catalyst 13 is made rich by injecting an additional fuel WR into the combustion chamber 2 in addition to the combustion use fuel Q from the fuel injector 2. Note that, in FIG. 14, the abscissa shows the crank angle. This additional fuel WR is injected at a timing at which it burns, but does not appear as engine output, that is, slightly before ATDC90° after top dead center of the compression stroke. This fuel amount WR is stored as a function of the amount of depression L of the accelerator pedal 40 and the engine speed N in the form of a map such as shown in FIG. 15 in advance in the ROM 32.

In the embodiment according to the present invention, the $NO_X$ removal action by the first $NO_X$ removal method and the $NO_X$ removal action by the second $NO_X$ removal method are selectively performed. Which of the $NO_X$ removal action by the first $NO_X$ removal method and the $NO_X$ removal action by the second $NO_X$ removal method to perform is determined for example as follows. That is, the $NO_X$ removal rate when the $NO_X$ removal action by the first $NO_X$ removal method is performed, as shown in FIG. 5, starts to rapidly fall when the temperature TC of the exhaust purification catalyst 13 becomes the limit temperature TX or lower. As opposed to this, as shown in FIG. 9, the $NO_X$ removal rate when the $NO_X$ removal action by the second $NO_X$ removal method is performed falls relatively slowly when the temperature TC of the exhaust purification catalyst 13 falls. Therefore, in the embodiment according to the present invention, when the temperature TC of the exhaust purification catalyst 13 is higher than the limit temperature TX, the $NO_X$ removal action by the first $NO_X$ removal method is performed, while when the temperature TC of the exhaust purification catalyst 13 is lower than the limit temperature TX, the $NO_X$ removal action by the second $NO_X$ removal method is performed.

Figure 16A:
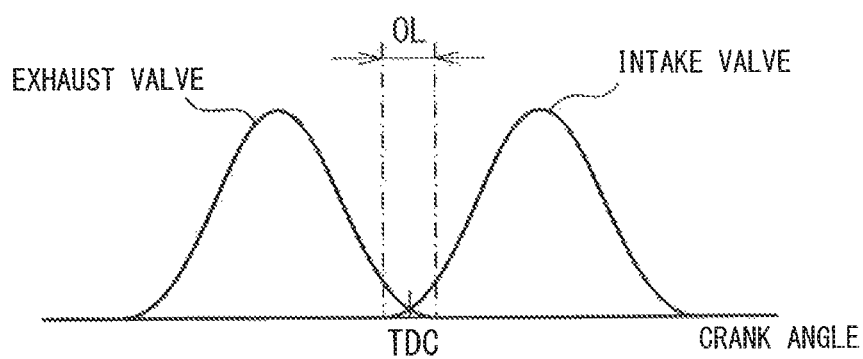
FIGS. 16A and 16B are graphs for explaining an overlap period.
Figure 16B:
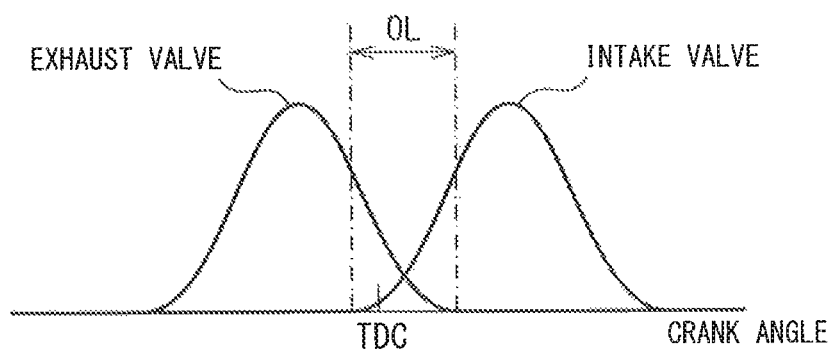

In this regard, the variable valve timing mechanism 43 (FIG. 1) is for changing the overlap period during which the intake valve and the exhaust valve are simultaneously open. In the example shown in FIG. 16A, the closing timing of the exhaust valve is advanced by the variable valve timing mechanism 43, whereby the overlap period OL becomes shorter. As opposed to this, in the example shown in FIG. 16B, the closing timing of the exhaust valve is delayed by the variable valve timing mechanism 43, whereby the overlap period OL becomes longer. In another embodiment, the closing timing of the intake valve is controlled so as to control the overlap period OL. Further, in another embodiment, the opening timing of the intake valve and the closing timing of the exhaust valve are controlled for controlling the overlap period OL.

During the overlap period, burned gas flows back from the combustion chamber 2 through the intake valve 1i to the intake manifold 4. This burned gas is then taken into the combustion chamber 2 together with fresh air, that is, is returned. As a result, if the overlap period OL becomes longer, an amount of the burned gas returned from the intake manifold 4 to the combustion chamber 2 increases, while if the overlap period OL becomes shorter, the amount of the burned gas returned from the intake manifold 4 to the inside of the combustion chamber 2 decreases.

In the internal combustion engine shown in FIG. 1, during normal control where rich control (explained later) is not being performed, the variable valve timing mechanism 43 is controlled so that an actual overlap period OL matches a base overlap period OLB. The base overlap period OLB is stored as a function of the engine operating state, for example, the engine load and engine speed, in advance in the form of a map inside the ROM 32. Note that, the base overlap period OLB may be a positive value, zero, or a negative value.

On the other hand, if referring to a ratio of an amount of EGR gas fed from the EGR passage 16 into the combustion chamber 2 to a total amount of gas fed into the combustion chamber 2 as an "EGR rate", in the embodiment according to the present invention, during normal control where rich control (explained later) is not being performed, an opening degree of the EGR control valve 17 is controlled so that an actual EGR rate matches a targeted base EGR rate REGRB. The base EGR rate REGRB is stored as a function of the engine operating state, for example, the engine load and engine speed, in advance in the form of a map inside the ROM 32.

In the embodiment according to the present invention, furthermore, during normal control where rich control (explained later) is not being performed, a throttle opening degree is controlled so that an actual intake air amount matches a targeted base intake air amount GaB. The base intake air amount GaB is stored as a function of the engine operating state, for example, the engine load and engine speed, in advance in the form of a map inside the ROM 32.

Now, in the embodiment according to the present invention, as explained above, to make the air-fuel ratio (A/F)in of the exhaust gas flowing into the exhaust purification catalyst 13 rich in the second $NO_X$ removal method, rich control which holds the air-fuel ratio of the exhaust gas discharged from the combustion chamber 2 temporarily richer than the stoichiometric air-fuel ratio is performed. In this case, the rich control is performed by injecting an additional fuel WR into the combustion chamber 2.

Figure 17:
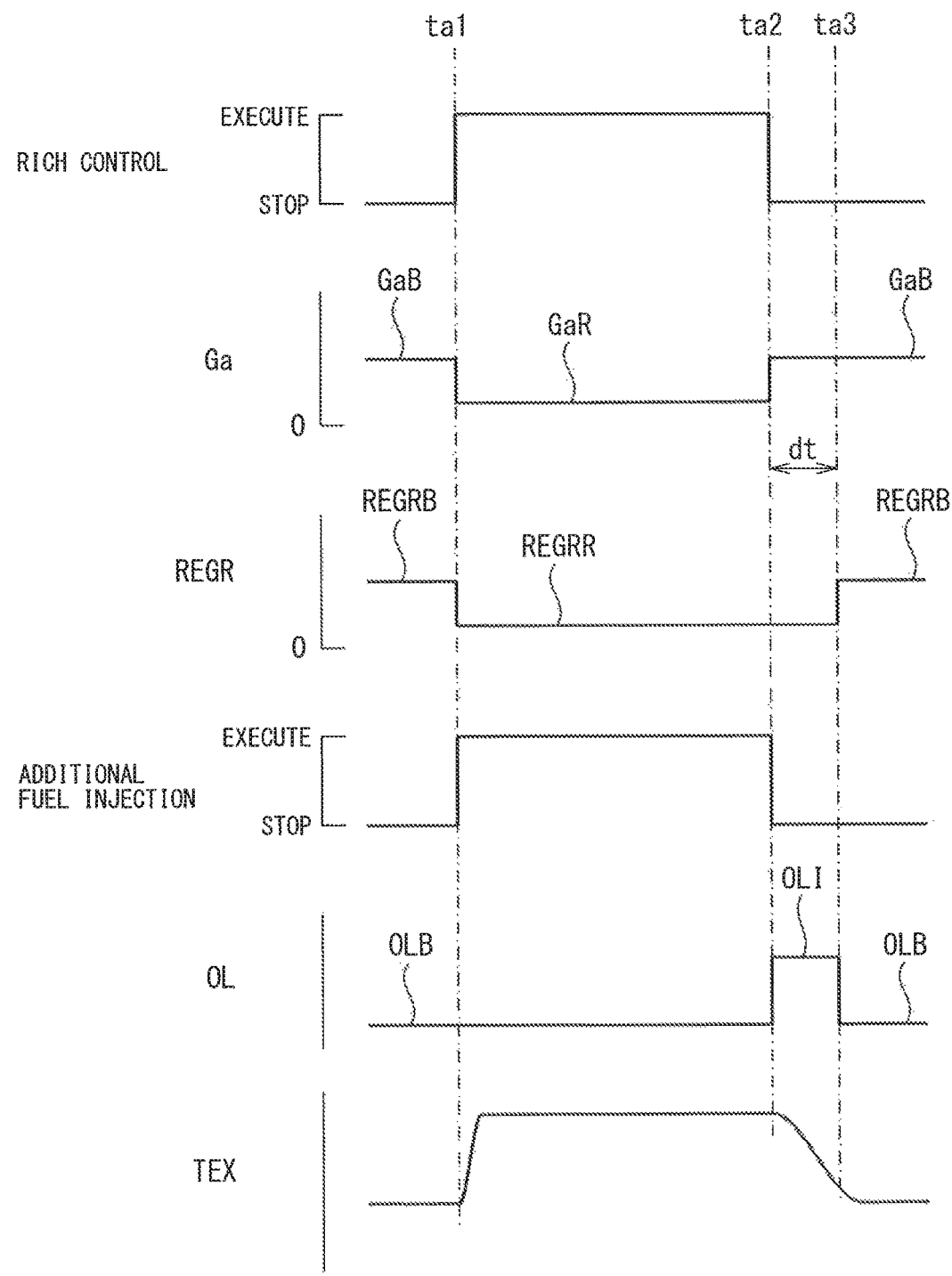
FIG. 17 is a time chart for explaining rich control.

Next, referring to FIG. 17, the rich control of the embodiment according to the present invention will be further explained. Referring to FIG. 17, if, at the time ta1, a signal is issued for starting the rich control, the intake air amount Ga is reduced from the base intake air amount GaB to an intake air amount GaR reduced for rich control. Further, the EGR rate REGR is lowered from the base EGR rate REGRB to an EGR rate REGRR lowered for rich control. On top of this, as shown in FIG. 14, additional fuel WR is injected. As a result, the air-fuel ratio (A/F)in of the exhaust gas discharged from the combustion chamber 2 is switched from the lean air-fuel ratio of the base air-fuel ratio to a rich air-fuel ratio. Therefore, in the rich control of the embodiment according to the present invention, the air-fuel ratio (A/F)in of the exhaust gas discharged from an engine combustion chamber 2 is temporarily held richer than the stoichiometric air-fuel ratio by injecting additional fuel in the expansion stroke or the exhaust stroke while the EGR rate REGR is made lower than the base EGR rate REGRB.

Next, if, at the time ta2, a signal is issued for stopping the rich control, the intake air amount is returned to the base intake air amount GaB and the additional fuel injection is stopped. Therefore, the air-fuel ratio (A/F)in of the exhaust gas is returned to the base air-fuel ratio and the temperature TEX of the exhaust gas discharged from the combustion chamber 2 falls. However, at the time ta2, the EGR rate REGR does not return to the base EGR rate REGRB but is maintained at the reduced EGR rate REGRR. On the other hand, at the time ta2, the overlap period OL is extended from the base overlap period OLB up to an overlap period OLI increased for rich control.

Next, at the time ta3, that is, after a predetermined delay time dt elapses, the overlap period OL is returned to the base overlap period OLB. Further, the EGR rate REGR is returned to the base EGR rate REGRB. Therefore, in the embodiment according to the present invention, when ending the rich control, the additional fuel injection is stopped while the EGR rate REGR is made lower than the base EGR rate REGRB, and the overlap period OL is made longer than the base overlap period OLB and is held. Next, when the delay time dt elapses, the EGR rate REGR and the overlap period OL are respectively reset to the base EGR rate REGRB and the base overlap period OLB.

This control is performed when ending the rich control for the following reason. That is, during rich control, the combustion of the additional fuel causes the temperature TEX of the exhaust gas discharged from a combustion chamber 2 to be considerably high. For this reason, when ending rich control, if immediately making the EGR rate REGR reset to the base EGR rate REGRB, a large amount of the high temperature EGR gas may flow into the EGR passage 16 and the EGR passage 16 or the EGR control valve 17 may be damaged by the heat.

On this point, in the embodiment according to the present invention, when ending the rich control, the EGR rate REGR is maintained low, so the high temperature EGR gas is prevented from flowing into the EGR passage 16 in a large amount. Therefore, the EGR passage 16 and the EGR control valve 17 are increased in durability.

Further, while the EGR rate REGR is maintained low, the overlap period OL is extended. As a result, the amount of the burned gas flowing back from the combustion chamber 2 to the intake manifold 4 and then being returned to the inside of the combustion chamber 2 is increased. This burned gas is inert gas and can function in the same way as EGR gas. Therefore, even if the EGR rate REGR is maintained low, the production of $NO_X$ can be reliably suppressed.

In the embodiment according to the present invention, the increased overlap period OLI is set so that the burned gas is increased by a decrease of the EGR rate REGR (REGRB-REGRR). Further, the above-mentioned delay time dt is set to a time required for the temperature of the EGR gas fed from the EGR passage 16 to the inside of the combustion chamber 2 to become lower than an allowable temperature.

Figure 18:
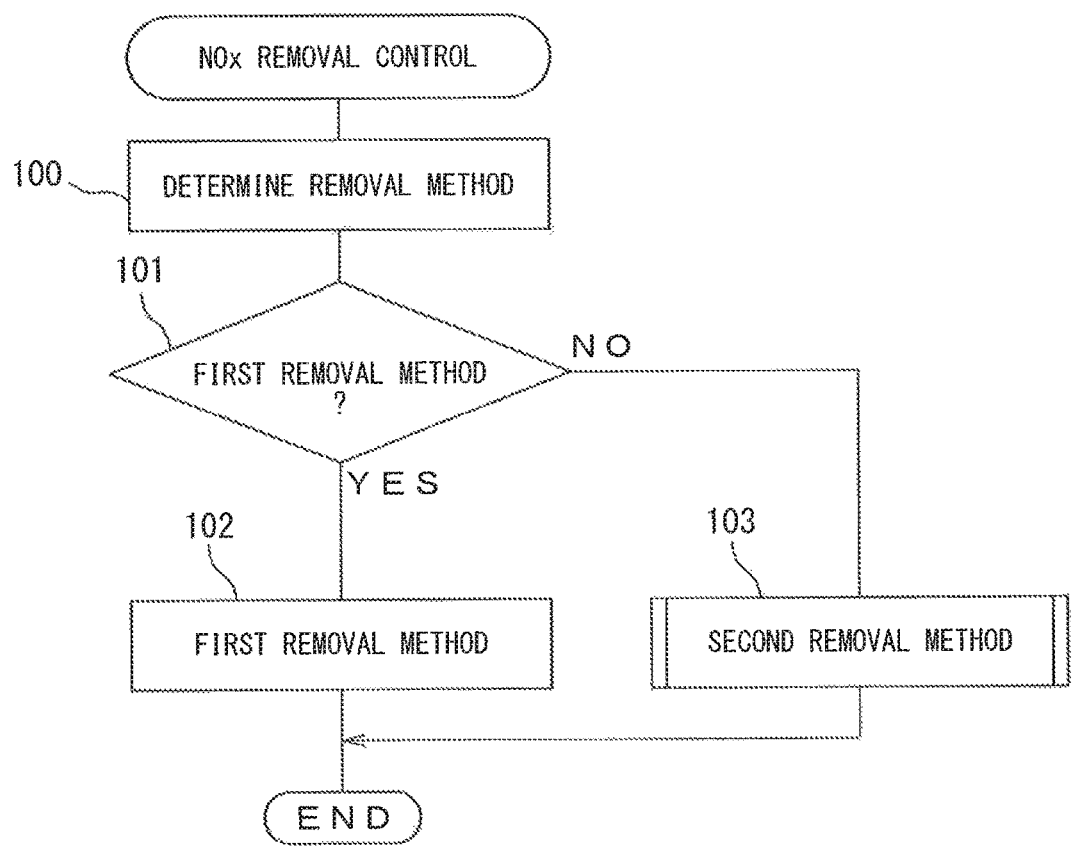
FIG. 18 is a flow chart for performing $NO_X$ removal control.

FIG. 18 shows a routine for performing the $NO_X$ removal control of an embodiment according to the present invention. This routine is performed by interruption every certain time period. Referring to FIG. 18, first, to start, at step 100, it is determined which of the $NO_X$ removal action by the first $NO_X$ removal method and the $NO_X$ removal action by the second $NO_X$ removal method to perform. Next, at step 101, it is judged if the $NO_X$ removal action by the first $NO_X$ removal method should be performed. If the $NO_X$ removal action by the first $NO_X$ removal method should be performed, the routine proceeds to step 102 where the $NO_X$ removal action by the first $NO_X$ removal method is performed. That is, the hydrocarbon feed valve 15 injects hydrocarbons of an amount W shown in FIG. 11 with a predetermined injection period $\Delta T$ which is determined in advance in accordance with the operating state of the engine.

If, at step 101, the $NO_X$ removal action by the second $NO_X$ removal method should be performed, the routine proceeds to step 103 where a routine for performing the $NO_X$ removal action by the second $NO_X$ removal method is executed. This routine is shown in FIG. 19.

FIG. 19 shows the routine for performing the $NO_X$ removal action by the second $NO_X$ removal method. This routine is performed at step 103 of FIG. 18. Referring to FIG. 19, first, at step 120, the stored $NO_X$ amount $\Sigma NOX$ is calculated. That is, the $NO_X$ amount NOXA discharged per unit time is calculated from the map shown in FIG. 13. By cumulatively adding the discharged $NO_X$ amount NOXA, the stored $NO_X$ amount $\Sigma NOX$ is calculated. Next, at step 121, it is judged if the stored $NO_X$ amount $\Sigma NOX$ exceeds the allowable value MAX. When $\Sigma NOX \leq MAX$, the routine proceeds to the next step 122 where the throttle opening degree is controlled so that the intake air amount Ga becomes the base intake air amount GaB, while the opening degree of the EGR valve 17 is controlled so that the EGR rate REGR becomes the base EGR rate REGRB. Further, the additional fuel injection is stopped. Further, the variable valve timing mechanism 43 is controlled so that the overlap period OL becomes the base overlap period OLB.

If $\Sigma NOX > MAX$, the routine proceeds from step 121 to step 123 where the throttle opening degree is controlled so that the intake air amount Ga becomes the reduced intake air amount GaR and the opening degree of the EGR control valve 17 is controlled so that the EGR rate REGR becomes the reduced EGR rate REGRR. Further, the additional fuel amount WR is calculated from the map shown in FIG. 15, then the additional fuel injection is performed. Therefore, rich control is started.

Next, at step 124, it is judged if the rich control should be ended. In the embodiment according to the present invention, it is judged that the rich control should be ended when a predetermined time elapses from when the rich control was started. When the rich control should not be ended, that is, when the rich control should be continued, the routine returns from step 124 to step 123. When the rich control should be ended, the routine proceeds from step 124 to step 125 where the throttle opening degree is controlled so that the intake air amount Ga becomes the base intake air amount GaB and the additional fuel injection is stopped. Therefore, the rich control is ended. Further, the variable valve timing mechanism 43 is controlled so that the overlap period OL becomes the increased overlap period OLI.

Next, at step 126, it is judged if the delay time dt has elapsed from when the rich control was ended. Until the delay time dt elapses, the routine returns from step 126 to step 125. If the delay time dt elapses, the routine proceeds from step 126 to step 127 where the opening degree of the EGR control valve 1 is controlled so that the EGR rate REGR becomes the base EGR rate REGRB. Further, the variable valve timing mechanism 43 is controlled is controlled so that the overlap period OL becomes the based overlap period OLB. Further, the stored $NO_X$ amount $\Sigma NOX$ is cleared.

Note that, as another embodiment, an oxidation catalyst may also be arranged inside the engine exhaust passage upstream of the exhaust purification catalyst 13, for reforming the hydrocarbons.

REFERENCE SIGNS LIST 2. combustion chamber
4. intake manifold
5. exhaust manifold
13. exhaust purification catalyst
15. hydrocarbon feed valve
16. EGR passage
17. EGR control valve
43. variable valve timing mechanism

The invention claimed is:

1. An exhaust purification system for an internal combustion engine, wherein an engine intake passage downstream of a throttle valve and an engine exhaust passage are connected by an exhaust gas recirculation passage, the exhaust purification system comprising:
   an electronic control unit;
   an exhaust gas recirculation control valve configured to receive an output from the electronic control unit for controlling an amount of recirculated exhaust gas flowing through the exhaust gas recirculation passage,
   the electronic control unit being configured to perform rich control to hold an air-fuel ratio of an exhaust gas discharged from an engine combustion chamber temporarily richer than the stoichiometric air-fuel ratio by injecting additional fuel into a cylinder in an expansion stroke or exhaust stroke while an exhaust gas recirculation rate is made lower than a base exhaust gas recirculation rate, a variable valve timing mechanism configured to receive an output from the electronic control unit to change an overlap period during which an opening timing of an intake valve overlaps with a closing timing of an exhaust valve and, when ending rich control performed by the electronic control unit, stop the injection of additional fuel and increase the overlap period from a base overlap period and hold the overlap period at the increased level while keeping the exhaust gas recirculation rate lower than the base exhaust gas recirculation rate, and when a predetermined delay time next elapses, reset the exhaust gas recirculation rate and the overlap period using the electronic control unit and the variable valve timing mechanism to the base exhaust gas recirculation rate and the base overlap period, respectively, and wherein an exhaust purification catalyst is arranged inside the engine exhaust passage and a hydrocarbon feed valve is arranged upstream of the exhaust purification catalyst inside the engine exhaust passage, a precious metal catalyst is carried on an exhaust gas flow surface of the exhaust purification catalyst and a basic exhaust gas flow surface part is formed around the precious metal catalyst, the exhaust purification catalyst has the property of reducing a $NO_X$ which is contained in exhaust gas if a concentration of hydrocarbons flowing into the exhaust purification catalyst is made to vibrate with an amplitude within a predetermined range of amplitude and with a period within a predetermined range of period and has the property of increasing a storage amount of $NO_X$ which is contained in exhaust gas if the vibration period of the hydrocarbon concentration is made longer than the predetermined range of period, and the electronic control unit being further configured to selectively perform a first $NO_X$ removal method of removing $NO_X$ contained in the exhaust gas by injecting hydrocarbons from the hydrocarbon feed valve with a period within the predetermined range of period and perform a second $NO_X$ removal method of releasing stored $NO_X$ from the exhaust purification catalyst and removing the $NO_X$ by performing rich control and making an air-fuel ratio of exhaust gas flowing into the exhaust purification catalyst rich with a longer period than the predetermined range of period.

2. The exhaust purification system for an internal combustion engine according to claim 1, wherein the electronic control unit is further configured to perform the first $NO_X$ removal method when a temperature of the exhaust purification catalyst is higher than a limit temperature and perform the second $NO_X$ removal method when the temperature of the exhaust purification catalyst is lower than the limit temperature.

* * * * *